United States Patent
Sander

(10) Patent No.: US 6,269,710 B1
(45) Date of Patent: Aug. 7, 2001

(54) LOCKING DEVICE FOR A ROTATABLE LATCHING ELEMENT OF A SELECTING DEVICE

(75) Inventor: Edmund Sander, Leonberg (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/375,449

(22) Filed: Aug. 17, 1999

(30) Foreign Application Priority Data

Sep. 26, 1998 (DE) ................................................ 198 44 279

(51) Int. Cl.⁷ ..................................................... G05G 13/00
(52) U.S. Cl. .............................. 74/483 R; 74/523; 477/99
(58) Field of Search ................................. 74/483 R, 523; 477/99

(56) References Cited

U.S. PATENT DOCUMENTS

| | | | |
|---|---|---|---|
| 4,932,283 | * 6/1990 | Ishigami et al. | 74/523 |
| 5,490,585 | * 2/1996 | Togano | 74/483 R |
| 5,755,313 | * 5/1998 | Kim | 74/483 R |
| 5,797,295 | * 8/1998 | Kataumi et al. | 74/483 R |
| 5,980,423 | * 11/1999 | Suzuki et al. | 477/99 |

FOREIGN PATENT DOCUMENTS

| | | |
|---|---|---|
| 0580970A1 | 2/1994 | (EP) . |
| WO96/35064 | 11/1996 | (WO) . |
| WO 98/40648 | 9/1998 | (WO) . |

OTHER PUBLICATIONS

Copy of International Search Report dated Jan. 11, 2000, and portion of English translation.

\* cited by examiner

Primary Examiner—David A. Bucci
Assistant Examiner—Chong H. Kim
(74) Attorney, Agent, or Firm—Crowell & Moring, L.L.P.

(57) ABSTRACT

A locking device for a rotatable latching element with a bending spring is provided for a gear selecting system of a motor vehicle. In order to improve such a locking device in terms of the structural cost required, it is proposed to locate the bending spring on the latching element. A first end of the bending spring is mounted in a fixed location on the latching element and the bending spring rests at a distance from its second free end on a support located on the latching element. Corresponding to the free end of the bending spring, a shoulder is provided in the vicinity of a rotational axis of the latching element on the housing of the selecting device. To unlock the locking device, an actuating element engages between the fixed bearing and the support for the bending spring.

12 Claims, 2 Drawing Sheets

LOCKING DEVICE FOR A ROTATABLE LATCHING ELEMENT OF A SELECTING DEVICE

BACKGROUND AND SUMMARY OF THE INVENTION

This application claims the priority of German application 198 44 279.3, filed in Germany on Sep. 26, 1998, the disclosure of which is expressly incorporated by reference herein.

The invention relates to a locking device for a rotatable latching element of a selecting device that has a selector lever.

In conjunction with a shifting device for a manual transmission, it is already known from WO 96/35064 to secure the keylock latching element in a specific position on the shifting device, with a leaf spring mounted integrally with the housing engaging an elongate opening of the latching element. An actuating element for the keylock latching element is provided on a shift lever, said element engaging the opening of the keylock latching element in a specific position of the shift lever and also moving. At the same time, the actuating element forces the leaf spring out of the elongate opening so that in order to actuate the keylock latching element, the latter is no longer locked. The disadvantage is that with this arrangement a housing wall or the like must be provided in the vicinity of the keylock latching element, on which the bending spring can be located.

A keylock latching element in general that has two latching elements corresponding with one another is already known from EP 0 580 970 A1.

By contrast with this prior art, a goal of the invention is to provide a locking device for a rotatable latching element which is improved in terms of its construction cost.

This goal is achieved according to the invention by providing a locking device for a rotatable latching element on a selecting device having a selector lever, with a bending spring being used to lock the latching element, wherein the bending spring is provided on the latching element, with a first end of the bending spring being mounted in a fixed position on the latching element, with the bending spring resting at a distance from its second free end on a support provided on the latching element, and with the second, free end being supported on a shoulder, said shoulder being provided on a housing on the selecting device radially with respect to a rotational axis of the latching element, and with an actuating element of the selector lever engaging the bending spring to unlock the locking device between a fixed bearing and the support.

According to the invention, it is proposed to locate the bending spring on the latching element, with a first end of the bending spring being mounted in a fixed location and a second, free end of the bending spring resting on a support. In correspondence with the free end of the bending spring, a shoulder is provided on the housing of the selecting device on a rotational axis of the latching element, against which the free end of the bending spring abuts. For unlocking, an actuating element of the selector lever engages between the fixed bearing and the support and bends the bending spring whose free end then no longer engages the shoulder integral with the housing. Advantageously, this locking device requires only one shoulder located radially to the rotational axis as a counter bearing that is integral with the housing. Then the latching element can be located at any point in the housing and requires no wall or the like to receive the bending spring.

Further advantageous features of preferred embodiments of the invention are described below and in the claims.

Thus, it is proposed to provide the bending spring at its fixed end with a matching eye and to provide the latching element with a pin onto which the eye can be pushed. In this way, the structural cost is further reduced since this design makes it possible to eliminate special fastening means.

It is also proposed to bend the free end of the bending spring at an angle and to provide a second support for the bending spring. The second support for the bending spring in this case is preferably provided in the vicinity of the first support, but offset in the direction of the fixed bearing. With this arrangement, the second support can slightly bend the spring further so that the bending spring is held under pretension and hence will not rattle. Since in this arrangement the bending spring does not have to be mounted on the latching element radially with respect to its rotational axis, the radial space required to mount the bending spring is significantly reduced and the latching element can be designed more freely.

To actuate the locking device, it is proposed that a pin be used for the purpose that is connected with an unlocking device on the selector lever. An elongate opening can be provided on the latching element to receive this pin, said opening extending essentially radially to the latching element. The latching element can therefore turn only when the selector lever is in a specific position and the unlocking device of the selector lever is moved.

Finally, it is proposed to use the locking device according to the invention for a rotatable latching element, namely a keylock lock.

Other objects, advantages and novel features of the present invention will become apparent from the following detailed description of the invention when considered in conjunction with the accompanying drawings.

DETAILED DESCRIPTION OF THE DRAWINGS

Figure 1:
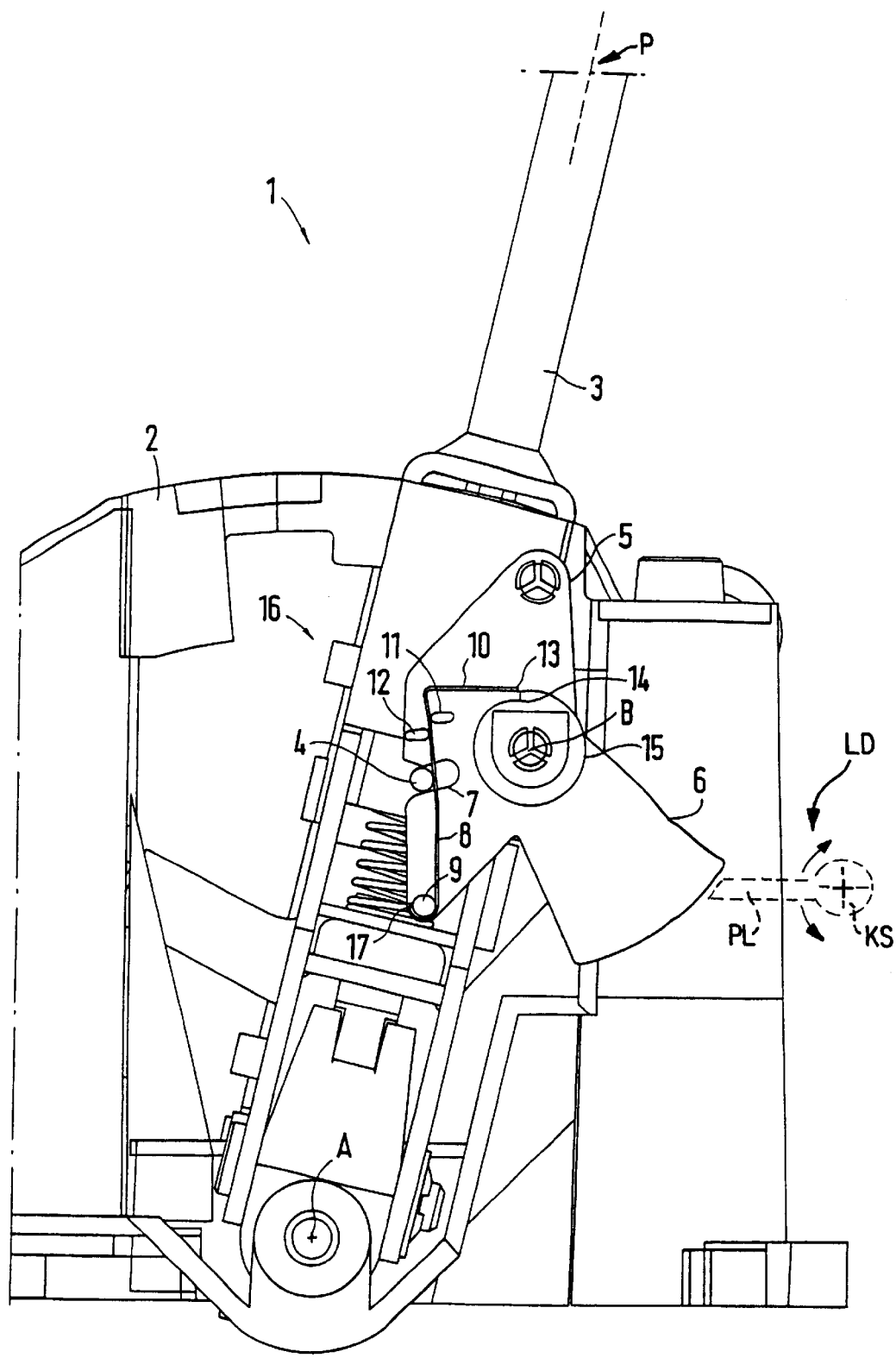
FIG. 1 is a side view of a selecting device with a rotatable latching element in the basic position of the latching element, constructed according to a preferred embodiment of the present invention.

FIG. 1 shows a selecting device 1 with a housing 2 and a selector lever 3 pivotably mounted to turn around a rotational axis A. Within the selector lever 3, a latching device is provided which blocks the selector lever 3 in certain positions relative to housing 2. A pin 4 is connected with this latching device. In the example shown, the selector lever 3 is in its end position 2 and the latching device of selector lever 3 is actuated in the unlocking direction, in other words pin 4 is in its lower position.

A latching element 5 is rotatably mounted on a rotational axis B on housing 2 as a part of a keylock latching device LD. In the position shown in FIG. 1, a projection 6 of the latching element 5 blocks the movement of another pivoting lever PL and thus prevents an ignition key, not shown, from being removed from keyslot KS.

In order to hold latching element 5 in the latching position shown in FIG. 1, when the selector lever 3 is not in position P, a locking device 16 is provided on latching element 5.

Locking device 16 consists of a leaf spring 8 whose first end is shaped as an eye 17 and is secured to a pin 9 of latching element 5. By bending spring 8 at an angle, a second leg 10 is formed. A short distance in front of the second leg 10, the bending spring 8 rests on a support 11 formed on the latching element 5. A second support 12 is provided on the other side of bending spring 8, offset toward pin 9, and serves both to secure bending spring 8 without play and to support forces initiated in the second leg 10.

With bending spring 8 in the assembled state, its free end 13 rests on a shoulder 14 provided on a housing part 15 of selecting device 1 radially relative to rotational axis B of latching element 5.

Between the second support 12 and pin 9, a groove 7 is provided in latching element 5 to receive pin 4. As pin 4, moving into groove 7, engages bending spring 8 between first support 11 and pin 9, bending spring 8 is bent completely and the free end 13 disengages from projection 14. In the drawing shown in FIG. 1, in other words with selector lever 3 in position P, pin 4 has already entered groove 7 to the point where bending spring 8 is sufficiently bent for the free end 13 no longer to engage shoulder 14. Latching element 5 can therefore be pivoted.

Figure 2:
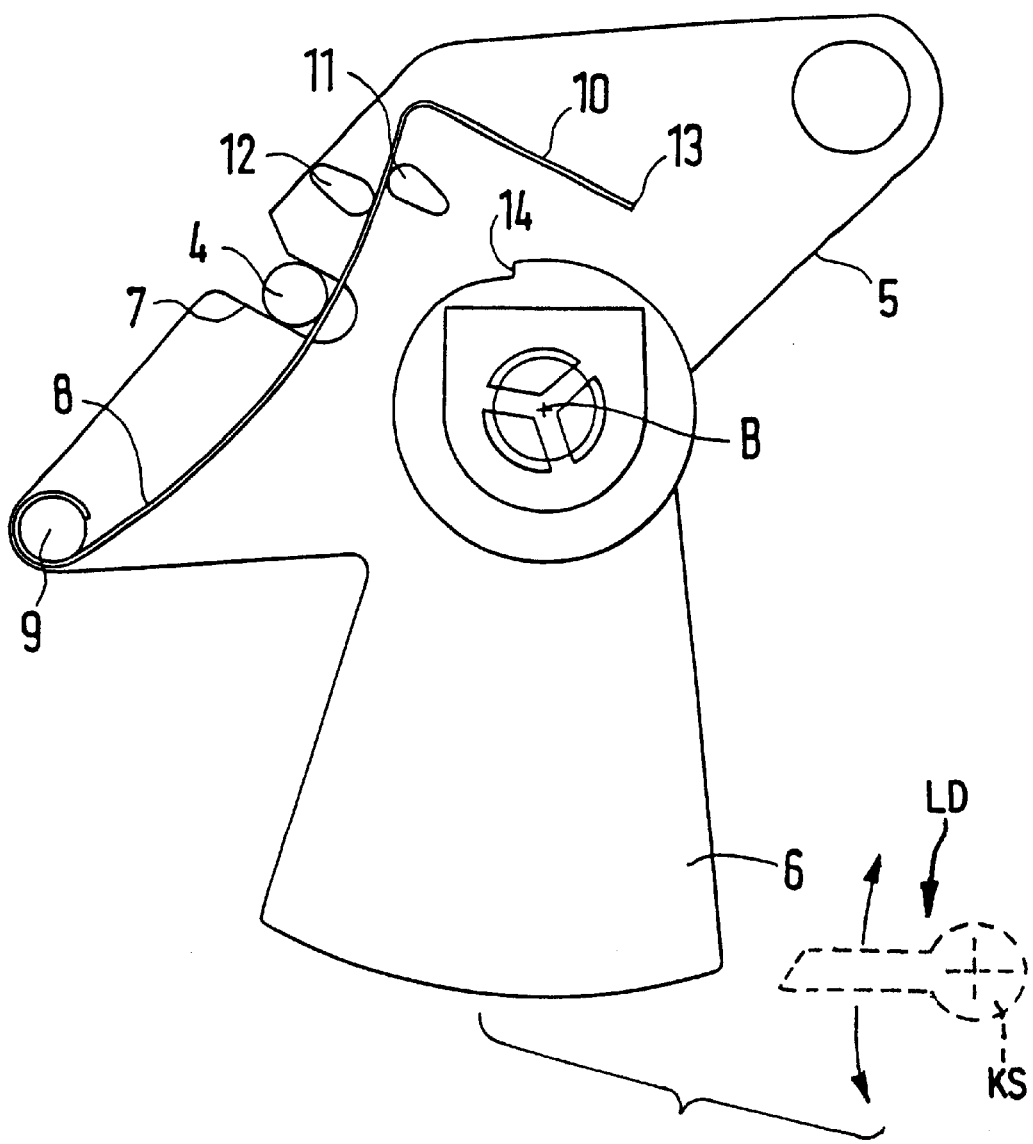
FIG. 2 shows the latching element in its unlocked position.

To pivot the latching element 5 into the position shown in FIG. 2, pin 4 is brought into its upper position relative to selector lever 3. In this position, a latching device, not shown, latches the selector lever 3. Since the pin 4 is engaged in groove 7 during this movement, the movement of pin 4 forces a pivoting movement of latching element 5.

In the position of latching element 5 shown in FIG. 2, projection 6 no longer engages the additional latching element PL. The additional latching element PL therefore is movable and can release an ignition key, not shown from keyslot KS. With the ignition key withdrawn, the second latching element prevents projection 6 from being pivoted back into its position shown in FIG. 1. As a result, pin 4 is held in its position as shown in FIG. 2 and the latching device of selector lever 3 cannot be unlocked. Selector lever 3 is thus latched in its position P when the ignition key is withdrawn and cannot be actuated.

The locking device 16 shown here can preferably be used in a keylock locking system; however it can also be used for other latching elements on switching or selecting devices.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A selecting device assembly comprising a selector lever and a locking device including a rotatable latching element on the selector lever and a bending spring operable to lock the latching element,
   wherein the bending spring is provided on the latching element, with a first end of the bending spring being mounted in a fixed position on the latching element, with the bending spring resting at a distance from its second free end on a first support provided on the latching element, and with the second, free end being supported on a shoulder, said shoulder being provided on a housing on the selecting device radially with respect to a rotational axis of the latching element, and with an actuating element of the selector lever engaging the bending spring to unlock the locking device between a fixed bearing and the first support, and
   wherein the actuating element of the selector lever is a first pin connected with a latching device of the selector lever, with an opening being provided in the latching element to receive the first pin, with the opening extending essentially radially with respect to the latching element.

2. A selecting device assembly according to claim 1, wherein the fixed bearing is made as a second pin and the first end of the bending spring is made in the form of an eye that matches the second pin.

3. A selecting device assembly according to claim 1, wherein the second free end of the bending spring is bent at an angle and a second support is provided for the bending spring.

4. A selecting device assembly according to claim 1, wherein the second free end of the bending spring is bent at an angle and a second support is provided for the bending spring.

5. A selecting device assembly according to claim 1, wherein a second support is provided for the bending spring, with the second support being offset relative to the first support toward the fixed bearing.

6. Locking device according to claim 2, wherein a second support is provided for the bending spring, with the second support being offset relative to the first support toward the fixed bearing.

7. Selecting device assembly according to claim 1, wherein the rotatable latching element is part of a keylock system of a switching or selecting device for a motor vehicle.

8. A shift gear selector assembly for a motor vehicle transmission, comprising:
   a housing,
   a manually operable selector lever,
   a pivotal latching element operable to latch the selector lever in predetermined positions with respect to the housing, and
   a bending spiring operable to selectively pivotally lock the latching element,
   wherein the bending spring is provided on the latching element, with a first end of the bending spring being mounted in a fixed position on the latching element, with the bending spring resting at a distance from its second free end on a first support provided on the latching element, and with the second, free end being supported on a shoulder, said shoulder being provided on the housing on the selecting device radially with respect to a rotational axis of the latching element, and with an actuating element of the selector lever engaging the bending spring to unlock the locking device between a fixed bearing and the first support, and
   wherein the actuating element of the selector lever is a first pin connected with a latching device of the selector lever, with an opening being provided in the latching element to receive the first pin, with the opening extending essentially radially with respect to the latching element.

9. An assembly according to claim 8, wherein the fixed bearing is made as a second pin and the first end of the bending spring is made in the form of an eye that matches the second pin.

10. An assembly according to claim 8, wherein the second free end of the bending spring is bent at an angle and a second support is provided for the bending spring.

11. An assembly according to claim 8, wherein a second support is provided for the bending spring, with the second support being offset relative to the first support toward the fixed bearing.

12. An assembly according to claim 8, wherein the latching element forms a part of a keylock latching device and which includes a projection operable to block pivoting movement of another pivoting lever to prevent removal of an ignition key.

* * * * *